US010280948B2

(12) United States Patent
Vigholm et al.

(10) Patent No.: US 10,280,948 B2
(45) Date of Patent: May 7, 2019

(54) HYDRAULIC SYSTEM AND METHOD FOR CONTROLLING AN IMPLEMENT OF A WORKING MACHINE

(71) Applicant: VOLVO CONSTRUCTION EQUIPMENT AB, Eskilstuna (SE)

(72) Inventors: Bo Vigholm, Stora Sundby (SE); Andreas Ekvall, Hallstahammar (SE); Linda Åberg, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 234 days.

(21) Appl. No.: 15/129,837

(22) PCT Filed: Apr. 4, 2014

(86) PCT No.: PCT/SE2014/000035
§ 371 (c)(1),
(2) Date: Sep. 28, 2016

(87) PCT Pub. No.: WO2015/152775
PCT Pub. Date: Oct. 8, 2015

(65) Prior Publication Data
US 2017/0211597 A1    Jul. 27, 2017

(51) Int. Cl.
*F15B 11/02* (2006.01)
*F15B 11/028* (2006.01)
(Continued)

(52) U.S. Cl.
CPC .............. *F15B 11/028* (2013.01); *E02F 3/34* (2013.01); *E02F 3/431* (2013.01); *E02F 3/847* (2013.01);
(Continued)

(58) Field of Classification Search
CPC .............. F15B 11/028; F15B 2211/625; F15B 2211/6653
See application file for complete search history.

(56) References Cited

U.S. PATENT DOCUMENTS 6,151,874 A * 11/2000 Eis .......................... A01B 63/10
56/10.2 E
7,124,576 B2 * 10/2006 Cherney ................ E02F 9/2217
60/414
(Continued)

FOREIGN PATENT DOCUMENTS

| EP | 1862599 A2 | 12/2007 |
| EP | 2239467 A2 | 10/2010 |
| WO | 2013100458 A1 | 4/2013 |

OTHER PUBLICATIONS

International Search Report (dated Dec. 1, 2014) for corresponding International App. PCT/SE2014/000035.
(Continued)

Primary Examiner — Thomas E Lazo
(74) Attorney, Agent, or Firm — WRB-IP LLP

(57) ABSTRACT

A hydraulic system is provided for a working machine that includes a hydraulic cylinder for raising and lowering an implement. The hydraulic system includes a sensor for measuring a pressure in the hydraulic cylinder; and a control unit for controlling the movement of the hydraulic cylinder; wherein the control unit is configured to compare a pressure value measured by the sensor with a preset target pressure level range and to control the pressure in the hydraulic cylinder to be within the preset target pressure level range by adding or draining hydraulic fluid to/from a pressure side of the hydraulic cylinder for maintaining a substantially constant ground contact force between the implement and the ground.

22 Claims, 4 Drawing Sheets

(51) Int. Cl.
*E02F 3/43* (2006.01)
*E02F 9/22* (2006.01)
*F15B 1/02* (2006.01)
*F15B 1/033* (2006.01)
*E02F 3/34* (2006.01)
*E02F 9/08* (2006.01)
*E02F 9/26* (2006.01)
*F15B 11/16* (2006.01)
*E02F 3/84* (2006.01)
*E02F 3/32* (2006.01)
*E02F 3/40* (2006.01)
*E02F 3/76* (2006.01)
*E02F 9/28* (2006.01)
*A01B 63/112* (2006.01)
*A01B 63/22* (2006.01)

(52) U.S. Cl.
CPC .......... *E02F 9/0883* (2013.01); *E02F 9/2203* (2013.01); *E02F 9/2217* (2013.01); *E02F 9/2228* (2013.01); *E02F 9/2267* (2013.01); *E02F 9/2271* (2013.01); *E02F 9/2296* (2013.01); *E02F 9/264* (2013.01); *E02F 9/265* (2013.01); *F15B 1/021* (2013.01); *F15B 1/033* (2013.01); *F15B 11/16* (2013.01); *A01B 63/112* (2013.01); *A01B 63/22* (2013.01); *E02F 3/32* (2013.01); *E02F 3/401* (2013.01); *E02F 3/7663* (2013.01); *E02F 9/2808* (2013.01); *E02F 9/2883* (2013.01); *F15B 2211/205* (2013.01); *F15B 2211/20546* (2013.01); *F15B 2211/212* (2013.01); *F15B 2211/3127* (2013.01); *F15B 2211/426* (2013.01); *F15B 2211/455* (2013.01); *F15B 2211/46* (2013.01); *F15B 2211/5158* (2013.01); *F15B 2211/5159* (2013.01); *F15B 2211/526* (2013.01); *F15B 2211/625* (2013.01); *F15B 2211/6313* (2013.01); *F15B 2211/6653* (2013.01); *F15B 2211/6654* (2013.01); *F15B 2211/6658* (2013.01); *F15B 2211/7053* (2013.01); *F15B 2211/71* (2013.01); *F15B 2211/7128* (2013.01); *F15B 2211/78* (2013.01)

(56) References Cited

U.S. PATENT DOCUMENTS

| | | | |
|---|---|---|---|
| 7,478,489 | B2 | 1/2009 | Anderson et al. |
| 7,908,048 | B2 | 3/2011 | Vigholm et al. |
| 2004/0088972 | A1 | 5/2004 | Harnischfeger et al. |
| 2005/0066655 | A1* | 3/2005 | Aarestad ............... E02F 9/2217 60/413 |
| 2006/0248868 | A1 | 11/2006 | Otto et al. |
| 2007/0056277 | A1 | 3/2007 | Mizoguchi et al. |
| 2008/0110165 | A1 | 5/2008 | Hamkins et al. |
| 2010/0268410 | A1 | 10/2010 | Vigholm et al. |
| 2011/0202232 | A1* | 8/2011 | Busch ................... A01B 63/00 701/36 |
| 2011/0220231 | A1 | 9/2011 | Sohn |
| 2013/0045071 | A1* | 2/2013 | Atkinson ................ E02F 3/434 414/685 |
| 2013/0129460 | A1 | 5/2013 | Gabibulayev |
| 2013/0340418 | A1* | 12/2013 | Wen ........................ F15B 1/024 60/327 |
| 2014/0360174 | A1 | 12/2014 | Sohn |

OTHER PUBLICATIONS

International Preliminary Report on Patentability (dated May 26, 2016) for corresponding International App. PCT/SE2014/000035.
European Official Action (dated Jan. 15, 2018) for corresponding European App. EP14 88 7970.

* cited by examiner

HYDRAULIC SYSTEM AND METHOD FOR CONTROLLING AN IMPLEMENT OF A WORKING MACHINE

BACKGROUND AND SUMMARY

The present invention relates to a hydraulic system for a working machine. The invention also relates to a control unit for controlling an implement of a working machine, a method for controlling the implement and a control system for the working machine. The invention is applicable on vehicles, in particularly working machines such as wheel loaders or graders. However, although the invention will mainly be described in relation to a wheel loader, the invention is of course also applicable for hydraulic system used in other applications, such as e.g. excavators or other construction equipments.

Working machines, such as e.g. wheel loaders, often utilize a lift arm provided with an implement, and one or more hydraulic cylinders for raising and lowering the lift arm. The implement can, for example, be a bucket or a plow. These types of implements are often provided with exchangeable wear parts, such as cutting edges and teeth. When using the implement, the wear parts are exposed to large stresses and strains due to the forces that affect the implement, which result in high wear of the components. It is hence a need of controlling the forces acting on the wear parts of the implements.

US 2011/0 220 231 disclose a boom cylinder control circuit for a construction machine. The control circuit comprises a two-way mode in which the boom cylinder can be freely moved up and down by external forces. This is useful when making the ground even by using the bucket.

The solution provided in US 2011/0 220 231 provides a ground contact force between the ground and the bucket which is dependent on the weight of the boom and the bucket. Hence, a heavier boom and bucket will provide more wear on the wear parts in relation to a less heavy boom and bucket.

Accordingly, there is a further need of reducing wear on the tool.

It is a desirable to provide a hydraulic system which enables the wear on the tool to be reduced.

According to a first aspect of the invention, there is provided a hydraulic system for a working machine comprising a hydraulic cylinder for raising and lowering an implement, the hydraulic system comprising a sensor for measuring a pressure in the hydraulic cylinder; and a control unit for controlling the movement of the hydraulic cylinder; wherein the control unit is configured to compare a pressure value measured by means of the sensor with a preset target pressure level range and to control the pressure in the hydraulic cylinder to be within the preset target pressure level range by adding or draining hydraulic fluid to/from a pressure side of the hydraulic cylinder for maintaining a substantially constant ground contact force between the implement and the ground.

The wording "pressure side" should in the following and throughout the entire description be interpreted as a side of the hydraulic cylinder in which hydraulic, fluid can be added and/or drained. More specifically, the pressure side of the hydraulic cylinder is the side of the cylinder in which hydraulic fluid is added or drained in order to control the ground contact force between the implement and the ground and also to control the lifting, lowering or tilting of the implement. Accordingly, adding or draining hydraulic fluid to/from the pressure side of the hydraulic cylinder will adjust the hydraulic pressure on the pressure side such that the ground contact force acting between the implement and the ground is actively controlled. The pressure side of the hydraulic cylinder can hence, as will be described further below, be a piston side of the hydraulic cylinder or a piston rod side of the hydraulic cylinder.

Furthermore, the preset target pressure level range can be set in a number of different manners and can be different depending on the specific application of the implement. For example, the preset target pressure level range can be set by the user of the working machine by means of a human-machine interface (HMI) where the user sets a desired pressure level in dependence on the specific operation he/she is intending to perform by the implement. The preset target pressure level range may also be preset without the need of an operator actively setting the pressure level. The latter alternative may be useful if the working machine is used for a single purpose where the ground contact force between the implement and the ground is always approximately the same. Examples of different pressure levels and their applications will be described further below. Still further, instead of having to manually set a preset target pressure level range, the system may be pre-calibrated with different modes which are linked to specific respective pressure values. Hereby, the user of the working machine may only need to choose what kind of operation he/she will perform and the system then sets the desired target pressure level range. Hence, the user may, for example, choose a "snow-plowing-mode" for which a specific pressure value is preset without the need of the user having to manually input a specific pressure value to the hydraulic system.

Moreover, the implement can be a bucket or the like coupled to a lift arm of the working machine. Hence, the wording "raising and lowering" should also include tilting of the implement, which when tilted is raised or lowered in relation to e.g. the ground by means of a tilt cylinder. The implement can also be a tool connected at e.g. a rear end of the working machine which is in contact with the ground by means of wheels or blades in cases where the working machine is a grader.

The present invention is based on the insight that by actively adding or draining hydraulic fluid to the pressure side of the hydraulic cylinder, the contact force between the implement and the ground can be kept substantially constant. This substantially constant contact force between the implement and the ground can be chosen to be at different levels depending on the specific application of the working machine. Hereby, the present invention provides for different modes of operation where the substantially constant contact force between the implement and the ground is set at different levels depending on the specific mode, which will be described further below. Hence, the operator of the working machine can use the "correct" ground contact force between the implement and the ground during the specific operation.

An advantage of the present invention is that the wear of the implement during use can be reduced by setting the ground contact force between the implement and the ground substantially constant. This is achieved since the adding/chaining of hydraulic fluid will control the raising/lowering of the implement such that the forces on the implement does not increase/decrease to undesired levels during operation.

Furthermore, the fuel consumption of the working machine may also be reduced by the hydraulic system of the present invention, since a relatively continuous operation mode is achieved by keeping the ground contact force substantially constant.

Accordingly, by controlling the ground contact force to be substantially constant, the force can be kept at desired levels. Hereby, the force can be controlled such that it does not damage the ground if such a scenario is desired, or provides a lame force on the ground to e.g. level out the ground if such a scenario is desired.

According to an example embodiment, the sensor may be in fluid communication with the pressure side of the hydraulic cylinder and electrically connected to the control unit.

Hereby, the sensor receives an indication of the pressure level in the hydraulic cylinder, which pressure level is received by the control unit. The control unit then determines whether to add or drain hydraulic fluid to/from the hydraulic cylinder, or, if the pressure level is within the preset target pressure level range to neither add or drain hydraulic fluid to/from the hydraulic cylinder.

According to an example embodiment, the hydraulic system may further comprise a hydraulic accumulator unit arranged in fluid communication with the pressure side of the hydraulic cylinder and the sensor.

An advantage of providing a hydraulic accumulator unit is that the adding/draining of hydraulic fluid to/from the hydraulic cylinder can be made more rapidly in comparison to adding hydraulic fluid from e.g. a pump unit or chain to e.g. a drain tank of the hydraulic system. More specifically, the hydraulic accumulator unit may receive hydraulic fluid from the hydraulic cylinder when the control unit determines that hydraulic fluid should be drained from the hydraulic cylinder. The hydraulic fluid provided to the hydraulic accumulator unit is then kept in the hydraulic accumulator unit until the control unit determines that hydraulic fluid should be added to the hydraulic cylinder. The hydraulic fluid is thereafter added to the hydraulic cylinder from the hydraulic accumulator unit. Hence, the hydraulic accumulator unit may thus serve the purpose of storage for hydraulic fluid. The hydraulic accumulator unit is in constant fluid communication with the pressure side of the hydraulic cylinder when hydraulic fluid is to be added or drained to/from the pressure side of the hydraulic cylinder. When the hydraulic cylinder is drained from hydraulic fluid, the hydraulic fluid is added to the hydraulic accumulator unit, and when hydraulic fluid is to be added to the hydraulic cylinder, the hydraulic fluid, is drained from the hydraulic, accumulator unit and added, to the hydraulic cylinder. Hence, hydraulic fluid can be added or drain to/from the hydraulic cylinder without the need of adding hydraulic fluid from the pump unit or drain hydraulic fluid to the drain tank, as long as the amount of hydraulic fluid added or drained to/from the hydraulic accumulator unit is within a specific range set by the hydraulic accumulator unit.

It should be readily understood that not all of the hydraulic fluid drained from the hydraulic cylinder must be provided to the hydraulic accumulator unit. Some of the hydraulic fluid may also be drained to e.g. a drain tank of the hydraulic system.

Likewise, when adding hydraulic fluid to the hydraulic cylinders, hydraulic fluid may be provided to the hydraulic cylinder from both the hydraulic accumulator unit as well as from e.g. a pump unit of the hydraulic system. This may be the case if the amount of hydraulic fluid added or drained to/from the hydraulic cylinders exceeds the specific range set by the hydraulic accumulator unit. Hereby, further hydraulic fluid may be added from the pump unit or drained to the drain tank.

According to an example embodiment, the pressure side of the hydraulic cylinder may be a piston side of the hydraulic cylinder, wherein hydraulic fluid is added or drained to/from the piston side of the hydraulic cylinder for maintaining the substantial constant ground contact force between the implement and the ground.

Hereby, the hydraulic system can add or drain hydraulic fluid to/from the piston side of the hydraulic cylinder, which is described further below. Adding or draining hydraulic fluid to the piston side of the hydraulic cylinder will in the following and throughout the entire description be denoted as the first operating mode.

An advantage of the first operating mode is that the contact force between the implement and the ground can be controlled to be within the range from zero to a force defined by the dead weight of the lift arm and the weight of the implement. Providing hydraulic fluid to/from the piston side of the hydraulic cylinder in this manner is advantageous for working operations such as e.g. plowing snow, where it is desired to keep the ground contact force between the implement and the ground relatively small in order to reduce wear on the implement as well as on the ground which is being plowed. When adding or draining hydraulic fluid to/from the piston side of the hydraulic cylinder as described above, a piston rod side of the hydraulic cylinder may be connected to a drain tank of the hydraulic system.

According to an example embodiment, the control unit may be configured to control a control valve such that a pump unit adds hydraulic fluid to the piston side of the hydraulic cylinder if the measured pressure value is below the preset pressure level range.

According to an example embodiment, the control unit may be configured to control a control valve such that hydraulic fluid is drained from the piston side of the hydraulic cylinder if the measured pressure value is above the preset pressure level range.

According to an example, the first operating mode works as follows. When the working machine is working on a relatively flat surface, no hydraulic fluid needs to be added or drained to/from the piston side of the hydraulic cylinder since the ground contact force between the implement and the ground will be kept relatively constant and within the preset range. However, if there is a bump on the ground, the hydraulic fluid pressure in the piston side of the hydraulic cylinder will decrease, which is sensed by the sensor, and thus the contact force between the implement and the ground will increase, when the implement is driven over the bump. Hereby, in order to maintain the substantially constant ground contact force between the implement and the ground, hydraulic fluid is added to the piston side of the hydraulic cylinder. The hydraulic fluid can be provided from the pump unit and/or from the above described hydraulic accumulator unit.

On the other hand, if there is a hole in the ground, the hydraulic fluid pressure in the piston side of the hydraulic cylinder will increase, which is sensed by the sensor, and thus the ground contact force between the implement and the ground will be reduced, when the implement is driven over the hole. In order to maintain the substantially constant contact force between the implement and the ground, hydraulic fluid is drained from the piston side of the hydraulic cylinder. The hydraulic fluid can be drained from the hydraulic cylinder to a drain tank of the hydraulic system and/or to the above described hydraulic accumulator unit.

According to an example embodiment, the pressure side of the hydraulic cylinder may be a piston rod side of the hydraulic cylinder, wherein hydraulic fluid is added or drained to/from the piston rod side of the hydraulic cylinder for maintaining the substantial constant ground contact force between the implement and the ground.

Hereby, the hydraulic system can add or drain hydraulic fluid to/from the piston rod side of the hydraulic cylinder, which is described further below. Adding or draining hydraulic fluid to the piston rod side of the hydraulic cylinder will in the following and throughout the entire description be denoted as the second operating mode.

An advantage of the second operating mode is that the ground contact force between the implement and the ground can be controlled to be within the range from a force defined by the dead weight of the lift arm and the implement to a force defined by the dead weight of the lift arm implement and a force from the hydraulic cylinder. Providing hydraulic fluid to/from the piston rod side of the hydraulic cylinder in this manner is advantageous for working operations when it is desired to e.g. pack the ground with a relatively high specific force, which force is larger than the force defined by the dead weight of the lift arm and the implement. According to an example where the working machine is a wheel loader, the largest ground contact force between the implement and the ground is then obtained when the front wheels of the wheel loader is no longer in contact with the ground and thus the wheel loader is only supported by the rear wheels and the implement, i.e. only the rear wheels and the implement of the wheel loader is in contact with the ground. When adding or draining hydraulic fluid to/from the piston rod side of the hydraulic cylinder as described above, the piston side of the hydraulic cylinder may be connected to a drain tank of the hydraulic system.

According to an example embodiment, the control unit may be configured to control a control valve such that a pump unit adds hydraulic fluid to the piston rod side of the hydraulic cylinder if the measured pressure value is below the preset pressure level range.

According to an example embodiment, the control unit may be configured to control a control valve such that hydraulic fluid is drained from the piston rod side of the hydraulic cylinder if the measured pressure value is above the preset pressure level range.

According to an example, the second operating mode works as follows. When the working machine is working on a relatively flat surface, no hydraulic fluid needs to be added or drained to/from the piston rod side of the hydraulic cylinder since the around contact force between the implement and the ground will be kept relatively constant and within the preset range. However, if there is a bump on the ground, the hydraulic fluid pressure in the piston rod side of the hydraulic cylinder will increase, which is sensed by the sensor, and thus the ground contact force between the implement and the around will increase, when the implement is driven over the bump. Hereby, in order to maintain the substantially constant contact force between the implement and the ground, hydraulic fluid is drained from the piston rod side of the hydraulic cylinder. The hydraulic fluid can be drained from the hydraulic cylinder to a drain tank of the hydraulic system and/or to the above described hydraulic accumulator unit.

On the other hand, if there is a hole in the ground, the hydraulic fluid pressure in the piston rod side of the hydraulic cylinder will decrease, which is sensed by the sensor, and thus the ground contact force between the implement and the ground will be reduced, when the implement is driven over the hole. In order to maintain the substantially constant ground contact force between the implement and the ground, hydraulic fluid is added to the piston rod side of the hydraulic cylinder. The hydraulic fluid added to the hydraulic cylinder can be provided from the pump unit and/or from the above described hydraulic accumulator unit.

The above description of the first and second operating modes have been described by the assumption that the implement is raised relative to the ground when the piston of the hydraulic cylinder is moved in a direction from the piston side to the piston rod side. However, the invention should not be limited to this assumption and hence works equally as well if the orientation of the hydraulic cylinder for some reason is the opposite, i.e. that the implement is raised relative to the ground when the piston of the hydraulic cylinder is moved in a direction from the piston rod side to the piston side. In such a case, the above examples of adding/draining hydraulic fluid to/from the piston side or the piston rod side are executed oppositely to the above description. More precisely, hydraulic fluid is drained from the piston side of the hydraulic cylinder if the implement is driven over a bump in the first operating mode, and added to the piston side if the implement is driven over a hole in the first operating mode. The same applies for the second operating mode and thus needs no further explanation.

According to an example embodiment, a piston side sensor valve may be arranged in fluid communication with the piston side of the hydraulic cylinder and the sensor. Hereby, when it is desired to measure the pressure in the piston side of the hydraulic cylinder, the piston side sensor valve can be positioned in an opened state.

According to an example embodiment, a piston rod side drain valve may be arranged in fluid communication with the piston rod side of the hydraulic cylinder and a drain tank.

According to an example embodiment, the control unit may be configured to position the piston side sensor valve and the piston rod side drain valve in an open state when adding or draining hydraulic fluid to/from the piston side of the hydraulic cylinder. Hereby, the hydraulic system may be operated in the first operating mode.

According to an example embodiment, a piston rod side sensor valve may be arranged in fluid communication with the piston rod side of the hydraulic cylinder and the sensor. Hereby, when it is desired to measure the pressure in the piston rod side of the hydraulic cylinder, the piston rod side sensor valve can be positioned in an opened state.

According to an example embodiment, a piston side drain valve may be arranged in fluid communication with the piston side of the hydraulic cylinder and a drain tank.

According to an example embodiment, the control unit may be configured to position the piston rod side sensor valve and the piston side drain valve in an open state when adding or draining hydraulic fluid to/from the piston rod side of the hydraulic cylinder. Hereby, the hydraulic system may be operated in the second operating mode.

According to a second aspect of the present invention, there is provided a control unit for controlling an implement of a working machine comprising a hydraulic cylinder for raising and lowering the implement, and a sensor for measuring a pressure in the hydraulic cylinder; wherein the control unit is configured to compare a pressure value measured by means of the sensor with a preset target pressure level range and to control the pressure in the hydraulic cylinder to be within the preset target pressure level range by adding or draining hydraulic fluid to/from a pressure side of the hydraulic cylinder for maintaining a substantially constant ground contact force between the implement and the ground.

Effects and features of this second aspect of the present invention are largely analogous to those described above in relation to the first aspect of the present invention.

According to a third aspect of the present invention, there is provided a method for controlling an implement of a working machine comprising a hydraulic cylinder for raising and lowering the implement; wherein the method comprises the steps of comparing a pressure value in the hydraulic cylinder with a preset target pressure level range; and controlling the pressure in the hydraulic cylinder to be within the preset target pressure level range by adding or draining hydraulic fluid to/from a pressure side of the hydraulic cylinder for maintaining a substantially constant ground contact force between the implement and the ground.

Effects and features of this third aspect of the present invention are largely analogous to those described above in relation to the first and second aspects of the present invention.

According to a fourth aspect of the present invention, there is provided a control system for a working machine provided with an implement and a hydraulic cylinder for raising and lowering the implement, wherein the control system has a selectable mode for controlling the lift arm, in which selectable mode hydraulic fluid is added or drained to/from a pressure side of the hydraulic cylinder for maintaining a substantially constant ground contact force between the implement and the ground.

An advantage is that the control system may utilize different modes depending on the specific working operation of the working machine. Hence, a control system is provided which is easy to handle by the operator of the working machine.

According to an example embodiment, the selectable mode may have a first operating mode in which the substantially constant ground contact force being lower than a ground contact force caused by the dead weight of the lift arm and the implement when the implement passively rest against the ground.

According to an example embodiment, hydraulic fluid may be configured to be added or drained to/from a piston side of the hydraulic cylinder when the control system is in the first operating mode.

According to an example embodiment, the selectable mode may have a second operating mode in which the substantially constant ground contact force being higher than a ground contact force caused by the dead weight of the lift arm and the implement when the implement passively rest against the ground.

According to an example embodiment, hydraulic fluid may be configured to be added or drained to/from a piston rod side of the hydraulic cylinder when the control system is in the second operating mode.

The first and second operating modes are described in detail above in relation to the first aspect of the present invention.

According to an example embodiment, the control system may be further configured to switch from the first operating, mode to the second operating mode by means of moving a piston rod side drain valve from an open position to a closed position and moving a piston side drain valve from a closed position to an air off position, wherein the piston rod side drain valve is arranged in fluid communication with the piston rod side of the hydraulic cylinder and a drain tank and the piston side drain valve is arranged in fluid communication with the piston side of the hydraulic cylinder and the drain tank.

Hereby, an easy and convenient way of switching between the first and second operating modes is provided, which is especially advantageous in situations where it is desired to have a relatively low contact force between the implement and the ground at a first instance and in a second instance have a relatively large contact force between the implement and the ground. An example of such a situation can be when the working machine in the first instance is plowing snow from the ground and in the second instance packing the ground which was previously covered by the snow.

Further effects and features of this fourth aspect of the present invention are largely analogous to those described above in relation to the first, second and third aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAIL DESCRIPTION

Figure 1:
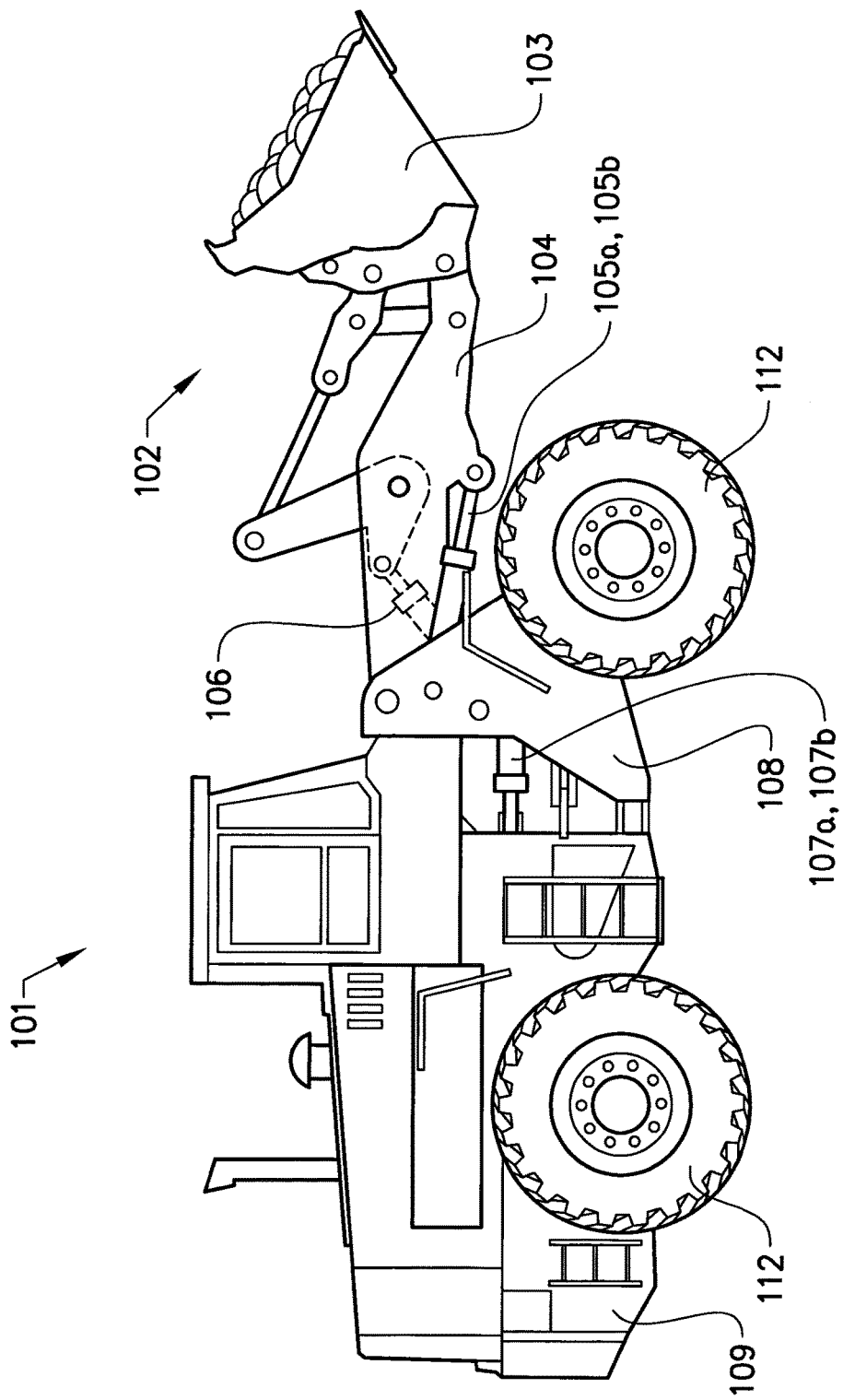
FIG. 1 is a side view of a working machine provided with a hydraulic system according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Reference is now made to FIG. 1 illustrating a working machine 101, here in the form of a wheel loader having a lift arm arrangement 102 with an implement 103. The term "implement" is intended to be any kind of tool using hydraulics, such as a bucket, a fork or a gripping tool arranged on a wheel loader. The illustrated implement is a bucket 103 which is arranged on a lift arm 104 for lifting and lowering the bucket 103. The bucket 103 can further be tilted or pivoted relative to the lift arm 04. The wheel loader 101 is provided with a hydraulic system 200, 300 (see FIGS. 2 and 3) comprising at least one hydraulic machine (not shown). The hydraulic machine can be a hydraulic pump, although it is preferred that the hydraulic machine can work as a hydraulic pump as well as a hydraulic motor with a reversed flow of hydraulic fluid. Such a hydraulic machine with said both functions can be used as a pump for providing the hydraulic system with hydraulic fluid, for example to lift and tilt the bucket, and as a hydraulic motor for recuperation of energy, for example during a lowering operation of the implement 103. In the example embodiment illustrated in FIG. 1 the hydraulic system comprises two hydraulic cylinders 105a, 105b for the operation of the lift arm 104 and a hydraulic cylinder 106 for tilting the bucket 103 relative to the lift arm 104. Furthermore the hydraulic system comprises two hydraulic cylinders 107a, 107b arranged on opposite sides of the wheel loader for turning the wheel loader by means of relative movement of a front body part 108 and a rear body part 109. In other words; the working machine is frame-steered by means of the steering cylinders 107a, 107b.

The following will now describe the hydraulic system according to example embodiments of the present invention. More specifically, the following will describe the hydraulic system n relation to the hydraulic cylinders 105a, 105b for operation of the lift arm 104 and the implement 103. However, the invention should not be construed as limited to the hydraulic cylinders 105a, 105b for operation of the lift arm 104, the invention works equally as well for the hydraulic cylinder 106 for tilting the bucket 103. However, no further description of the hydraulic cylinder 106 for tilting the bucket 103 as well as the hydraulic cylinders 107a, 107b arranged for turning the wheel loader will be given.

Figure 2:
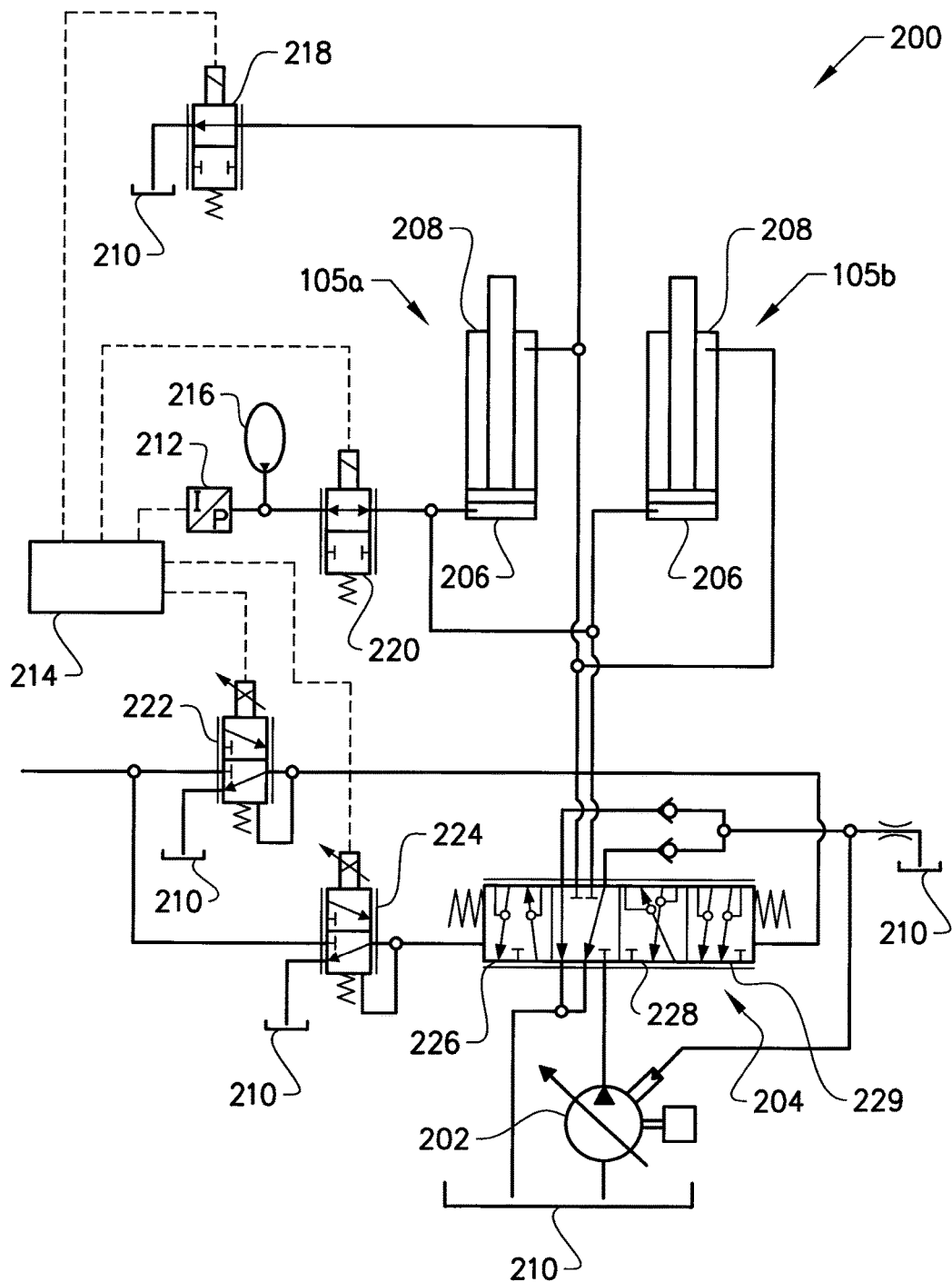
FIG. 2 is a schematic view illustrating a hydraulic system according to an example embodiment of the present invention.

Turning first to FIG. 2, which illustrates an example embodiment of a hydraulic system 200 according to the present invention. The hydraulic system 200 comprises a pump unit 202 which is configured to supply hydraulic fluid to the hydraulic system 200 via a control valve 204. The control valve 204 comprises different positions 226, 228, 229 for guiding the hydraulic fluid to different positions of the system, which will be described further below. The system also comprises two hydraulic cylinders 105a, 105b. Each of the cylinders 105a, 105b has a piston side 206 and a piston rod side 208. The piston side 206 and the piston rod side 208 can both be in fluid communication with the pump unit 202 via the control valve 204, depending on the positioning of the control valve 204. Furthermore, the piston side 206 and the piston rod side 208 of the hydraulic cylinders 105a, 105b can also be in fluid communication with a drain tank 210 of the hydraulic system 200. Hereby, hydraulic fluid can be provided to the piston side 206 or the piston rod side 208 of the hydraulic cylinders 105a, 105b from the pump unit 202, or hydraulic fluid can be drained from the piston side 206 and the piston rod side 208 to the drain tank 210.

Moreover, the hydraulic system 200 further comprises a sensor 212, a control unit 214 and a hydraulic accumulator unit 216. The sensor 212 is, in the example embodiment depicted in FIG. 2, arranged in fluid communication with the piston side 206 of the hydraulic cylinders 105a, 105b, for measuring a pressure in the piston side 206. The hydraulic accumulator unit 216 is arranged between, and in fluid communication with, the sensor 212 and the piston side 206 of the hydraulic cylinders 105a, 105b.

The control unit 214 is connected to the sensor 212 and to a piston rod side drain valve 218 arranged in fluid communication between the piston rod side 208 of the hydraulic cylinder 105a, 105b and the drain tank 210, as well as connected to a piston side sensor valve 220 arranged in fluid communication between the sensor 212 and the piston side 206 of the hydraulic cylinders 105a, 105b. Furthermore, the control unit is also connected to two valve units 222, 224 for controlling the control valve 204.

It should be understood that the positioning of the sensor 212 in FIG. 2 is mainly for illustrative purposes. The sensor 212 may instead, for example, be positioned in fluid communication between the piston side 206 of the hydraulic cylinders 105a, 105b and the piston side sensor valve 220, or between the piston side sensor valve 220 and the hydraulic accumulator unit 216. The purpose of the sensor 212 in FIG. 2 is hence to measure the pressure level in the piston side 206 of the hydraulic cylinders 105a, 105b.

The hydraulic system 200 depicted in FIG. 2 is configured to execute a first operating mode in which the ground contact force between the implement 103 (see FIG. 1) and the ground is kept substantially constant and below the dead weight of the lift arm 104 and the implement 103. It should be readily understood that the dead weight of the lift arm 104 and the implement 103 should be construed, throughout the entire description, as the gravitational three resulting from the lift arm 104 and the implement 103 which rests on the ground. Since the lift arm 104 is in connection to the working machine, a portion of the gravitational force is acting on the joint which connects the lift arm 104 to the working machine 101 and a remaining portion of the gravitational force is acting on the ground. How to calculate the portion of the gravitational three acting on the ground is well known to the person skilled in the art. Accordingly, in the first operating mode, the ground contact force between the implement 103 and the ground is kept substantially constant and lower than the weight on the ground if the implement 103 would passively rest on the ground. The following will describe the first operating mode in further detail.

When the hydraulic system 200 is arranged to execute the first operating mode, the driver of the working machine can provide input to the control unit 214 regarding the desired ground contact force between the implement and the ground that is desired during the operation. This desired ground contact three, which corresponds to a desired pressure in the piston side 206 of the hydraulic cylinders 105a, 105b, is set as a preset target pressure level range, in which range the pressure in the piston side 206 should be maintained during the operation of the first operating mode. The preset target pressure level range can be set by the operator of the working machine via a HMI or the like.

In the first operating mode, the control unit 214 controls each of the piston rod side drain valve 218 and the piston side sensor valve 220 to be positioned in an open state, respectively. Hereby, the piston rod side 208 of the hydraulic cylinders 105a, 105b is connected to the drain tank 210 and the piston side 206 of the hydraulic cylinders 105a, 105b is connected to the sensor 212 and the hydraulic accumulator unit 216. Further, the control unit 21 controls the control valve 204 such that hydraulic fluid can be added to the piston side 206, by moving the control valve 204 to the first valve box 226, or to drain hydraulic fluid from the piston side 206 by moving the control valve 204 to the second valve box 228.

When the working machine is operating in the first operating mode, the pressure in the piston side 206 of the hydraulic cylinders 105a, 105b is continuously measured by means of the sensor 212, which in turn provides a signal to the control unit 214 indicative of the current pressure in the piston side 206. In the event that the working machine is, for example, running over a bump or the like, the pressure in the piston side 206 of the hydraulic cylinders 105a, 105b will decrease such that the force between the implement and the ground will increase. In order to maintain the pressure in the piston side to be within the preset target pressure level range, hydraulic fluid is added to the piston side 206. The hydraulic fluid can be provided from the pump unit 202 via the control valve 204 or from the hydraulic accumulator unit 216. The hydraulic fluid may also be provided from both the pump unit 202 as well as from the hydraulic accumulator unit 216. Hereby, the pressure in the piston side 206 of the hydraulic cylinders 105a, 105b will increase to be within the preset target pressure level range, such that the ground contact force between the implement and the ground is maintained substantially constant.

On the other hand, in the event that the implement will be forced downwards due to e.g. a hole in the ground or the like, the pressure in the piston side 206 of the hydraulic cylinders 105a, 105b will increase and thus the ground contact force between the implement and the ground will be reduced. In order to maintain the pressure in the piston side 206 to be within the preset target pressure level range, hydraulic fluid is drained from the piston side 206 of the hydraulic cylinders 105a, 105b, either to the drain tank 210, the hydraulic accumulator unit 216 or to both the drain tank 210 as well as to the hydraulic accumulator unit 216. Hereby, the pressure in the piston side 206 of the hydraulic cylinders will decrease to be within the preset target pressure level range, such that the ground contact force between the implement and the ground is maintained substantially constant.

Figure 3:
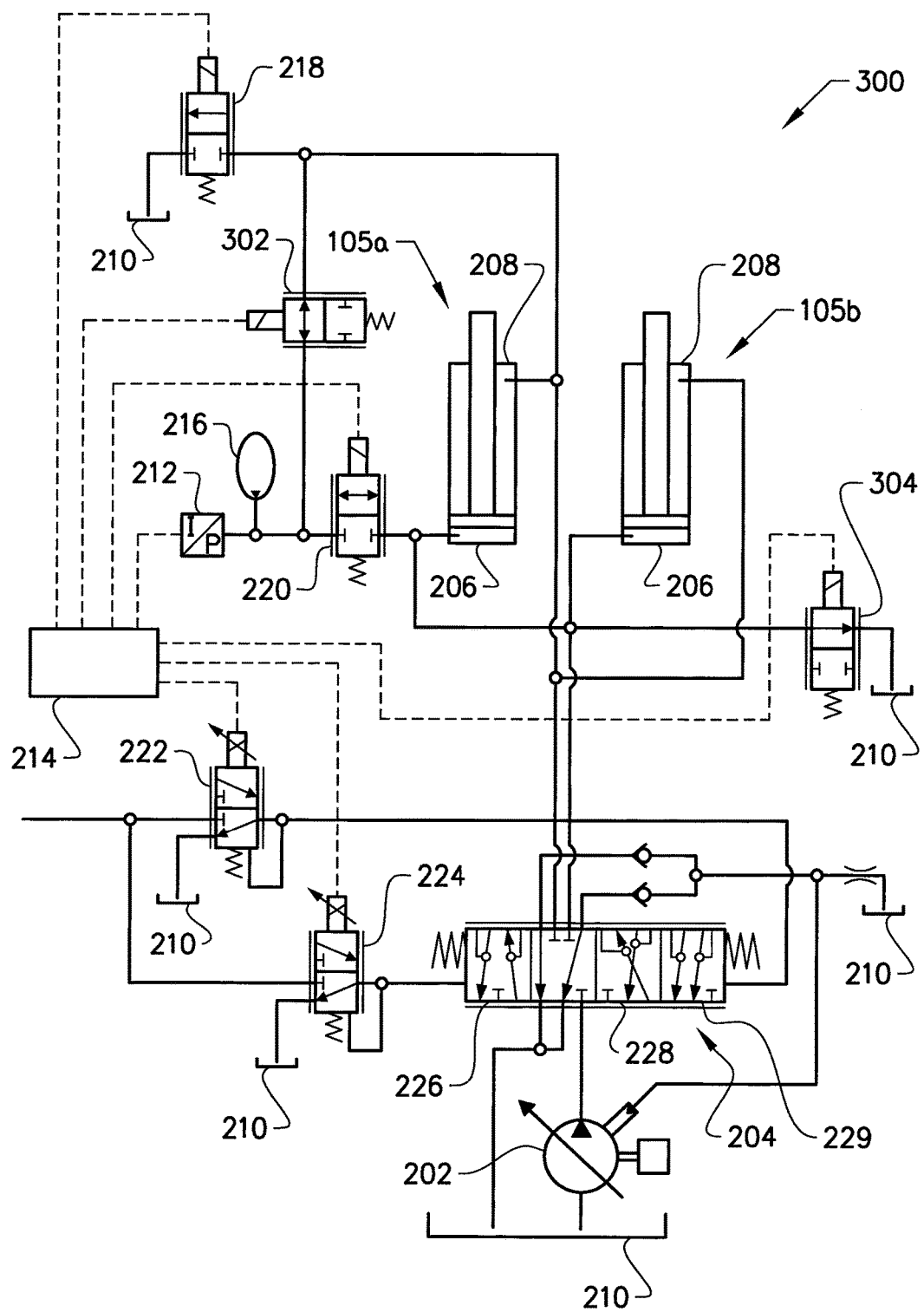
FIG. 3 is a schematic view illustrating a hydraulic system according to another example embodiment of the present invention.

Reference is now made to FIG. 3, which, illustrates another example embodiment of a hydraulic system 300 according to the present invention. The hydraulic system depicted in FIG. 3 is able to execute the first operating mode as described above, but can also execute a second operating mode, in which the ground contact force between the implement 103 (see FIG. 1) and the ground is kept substantially constant and above the dead weight of the lift arm 104 and the implement 103.

The difference between the hydraulic system 300 depicted in FIG. 3 and the hydraulic system 200 depicted in FIG. 2 is that a piston rod side sensor valve 302 and a piston side drain valve 304 is added to the hydraulic system 300 depicted in FIG. 3. The piston rod side sensor valve 302 is arranged in fluid communication between the sensor 212 and the piston rod side 208 of the hydraulic cylinders 105a, 105b, while the piston side drain valve 304 is arranged in fluid communication between the piston side 206 of the hydraulic cylinders 105a, 105b and the drain tank 210. Hereby, the sensor is in fluid communication with the piston rod side 208 when the piston rod side sensor valve 302 is positioned in an open state.

When the hydraulic system 300 is arranged to execute the second operating mode, the driver of the working machine can provide input to the control unit in a similar manner as described above for the first operating mode.

In the second operating mode, the control unit 214 controls each of the piston rod side drain valve 218 and the piston side sensor valve 220 to be positioned in a closed state, respectively. Further, the control unit 214 also controls each of the piston rod side sensor valve 302 and the piston side drain valve 304 to be positioned in an opened state, respectively. Hereby, the piston side 206 of the hydraulic cylinders 105a, 105b is connected to the drain tank 210 and the piston rod side 208 of the hydraulic cylinders 105a, 105b is connected to the sensor 212 and the hydraulic accumulator unit 216. Further, the control unit 214 controls the control valve 204 such that hydraulic fluid pan be added to the piston rod side 208 of the hydraulic cylinders 105a, 105b by moving the control valve to the second valve box 228, or to drain hydraulic fluid from the piston rod side 208 of the hydraulic cylinders 105a, 105b by moving the control valve 204 to the first valve box 226.

When the working machine is operating in the second operating mode, the pressure in the piston rod side 208 is continuously measured by means of the sensor 212, which in turn provides a signal to the control unit 214 indicative of the current pressure in the piston rod side 208 of the hydraulic cylinders 105a, 105b. In the event that the working machine is, for example, running over a bump or the like, the pressure in the piston rod side 208 of the hydraulic cylinders 105a, 105b will increase such that the force between the implement and the ground will also increase in order to maintain the pressure in the piston rod side to be within the preset target pressure level range, hydraulic fluid is drained from the piston rod side 208, either to the drain tank 210, the hydraulic accumulator unit 216 or to both the drain tank 210 as well as to the hydraulic accumulator unit 216. Hereby, the pressure in the piston rod side 208 of the hydraulic cylinders 105a, 105b will decrease to be within the preset target pressure level range, such that the ground contact force between the implement and the ground is maintained substantially constant.

On the other hand, in the event that the implement will be forced downwards due to e.g. a hole in the ground or the like, the pressure in the piston rod side 208 of the hydraulic cylinders 105a, 105b will be reduced and thus the ground contact force between the implement and the ground will also be reduced. In order to maintain the pressure in the piston rod side 208 to be within the preset target pressure level range, hydraulic fluid is added to the piston rod side 208, either from the pump unit 202 or from the hydraulic accumulator unit 216, or from both the pump unit 202 and the hydraulic accumulator unit 216. Hereby, the pressure in the piston rod side 208 of the hydraulic cylinders will increase to be within the preset target pressure level range, such that the ground contact force between the implement and the ground is maintained substantially constant.

During operation of the working machine, the operator may switch from the first operating mode to the second operating mode, or vice versa. This can be executed by means of the operator providing input regarding the switch between the modes to a HMI or the like, which is connected to the control unit 214. The following will describe the procedure for switching from the second operating mode to the first operating mode with reference to FIG. 3.

As can be seen in FIG. 3, the hydraulic system has activated the second operating mode. This is achieved by positioning the piston rod side sensor valve 302 and the piston side drain valve 304 in a respective open state, thus allowing hydraulic fluid to pass there through. The hydraulic system is hence operated in the second operating mode as described above.

When the operator of the working machine wants to switch from the second operating mode to the first operating mode, the control unit 214 positions the piston rod side sensor valve 302 and the piston side drain valve 304 in, a closed state and positions the piston rod side drain valve 218 and the piston side sensor valve 220 in an open state. Hereby, hydraulic fluid is allowed to pass through the piston rod side drain valve 218 and the piston side sensor valve 220, while being prevented from passing through the piston rod side sensor valve 302 and the piston side drain valve 304. The hydraulic system 300 depicted in FIG. 3 is then operated and works as the hydraulic system 200 depicted in FIG. 2.

Still further, the operator may also arrange the hydraulic system in a "float triode". This float mode allows the ground contact force between the implement and the ground to always correspond to the dead weight of the lift arm and the implement. Positioning the hydraulic system in the float mode is achieved by positioning the piston rod side drain valve 218, the piston side sensor valve 220, the piston rod side sensor valve 302 and the piston side drain valve 304 in a closed state and to position the control valve 204 in the box to the right 229 as depicted in FIG. 3. In the float mode, both the piston side 206 and the piston rod side 208 of the hydraulic cylinders are connected to the drain tank 210. The float mode may also be achieved by positioning both of the piston rod side drain valve 218 and the piston side drain valve 304 in an open state.

Moreover, in order to increase the accuracy of the first and second operating modes, the hydraulic system may need to be calibrated from time to time. For the first operating mode, this calibration can be executed by calculating the weight of the lift arm and the implement by receiving a pressure value from the sensor 212 when the first mode is activated and the implement is just above the ground. For the second operating mode, the calibration is executed by calculating the weight of the working machine by receiving a pressure value from the sensor 212 when the second operating mode is activated and the working machine, here in the form of a wheel loader, is lifted such that the front wheels are above the ground and thus only the rear wheels and the implement of the wheel loader is in contact with the ground.

Figure 4:
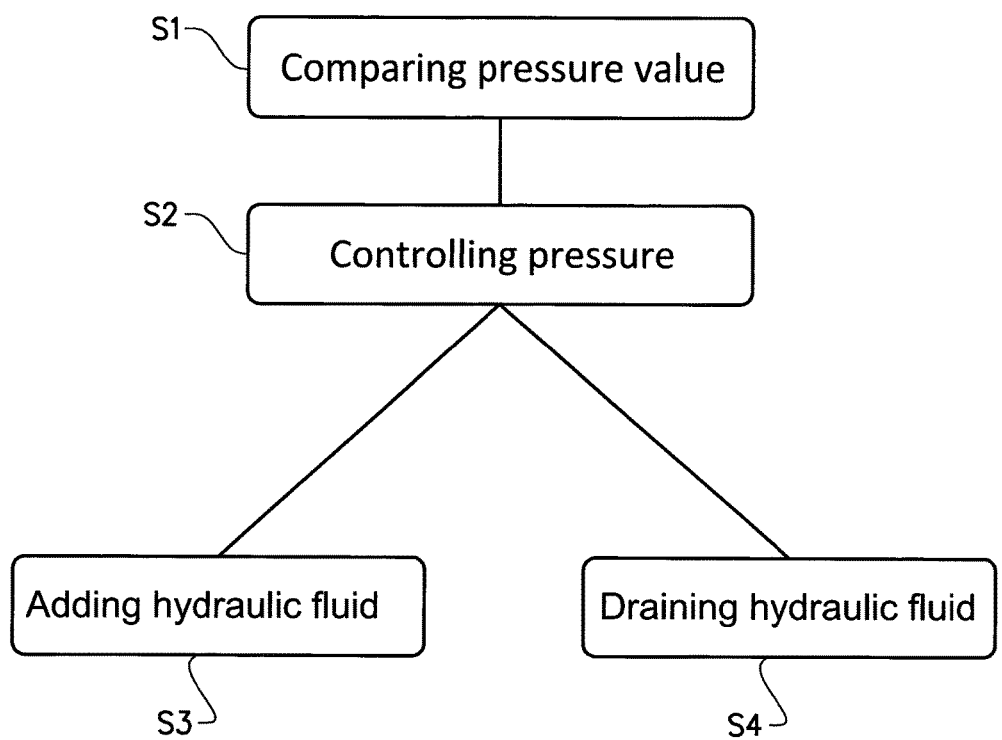
FIG. 4 is a flow chart of a method according to an example embodiment of the present invention.

Finally, reference is made to FIG. 4 which illustrates a flow chart of a method according to an example embodiment of the present invention, which method summarizes the above description of the functionality for the first and second operating modes. The method for controlling the lift arm of the working machine is executed as follows. At a first step, the pressure value in the hydraulic cylinders 105a, 105b is compared S1 to the preset target pressure level range. This preset target pressure level range can be set differently and is described above in relation to the first and the second operating modes. Thereafter, the method controls S2 the pressure in the hydraulic cylinders 105a, 105b to be within the preset target pressure level range. This is executed by either adding S3 hydraulic fluid to the pressure side of the hydraulic cylinders 105a, 105b, which pressure side can be either the piston side 206 or the piston rod side 208 depending on which mode being activated, or draining S4 hydraulic fluid from the pressure side of the hydraulic cylinders 105a, 105b. It is naturally understood that if the step of comparing S1 the pressure value in the hydraulic cylinders 105a, 105b with the preset target pressure level range results in that the pressure is within the range, no further action is taken at the moment. Hence, no adding or draining of hydraulic fluid to/from the hydraulic cylinders 105a, 105b is performed.

It is to be understood that the present invention is not limited to the embodiments described above and illustrated in the drawings; rather, the skilled person will recognize that many changes and modifications may be made within the scope of the appended claims.

The invention claimed is:

1. A hydraulic system for a working machine comprising a hydraulic cylinder for raising and lowering an implement, the hydraulic system comprising
a sensor for measuring a pressure in the hydraulic cylinder;
a control unit for controlling the movement of the hydraulic cylinder; and
a hydraulic accumulator unit arranged in fluid communication with a pressure side of the hydraulic cylinder and the sensor;
wherein the control unit is configured to compare a pressure value measured by the sensor with a preset target pressure level range and to control the pressure in the hydraulic cylinder to be within the preset target pressure level range by adding or draining hydraulic fluid to/from the pressure side of the hydraulic cylinder solely by receiving hydraulic fluid from the hydraulic accumulator unit or by, providing hydraulic fluid to the hydraulic accumulator unit for maintaining a substantially constant ground contact force between the implement and the ground.

2. The hydraulic system according to claim 1, wherein the sensor is in fluid communication with the pressure side of the hydraulic cylinder and electrically connected to the control unit.

3. The hydraulic system according to claim 1, wherein the pressure side of the hydraulic cylinder is a piston side of the hydraulic cylinder, wherein hydraulic fluid is added or drained to/from the piston side of the hydraulic cylinder for maintaining the substantial constant ground contact force between the implement and the ground.

4. The hydraulic system according to claim 3, wherein the control unit is configured to control a control valve such that hydraulic fluid is drained from the piston side of the hydraulic cylinder if the measured pressure value is above the preset pressure level range.

5. The hydraulic system according to claim 3, wherein a piston side sensor valve is arranged In fluid communication with the piston side of the hydraulic cylinder and the sensor.

6. The hydraulic system according to claim 5, wherein the control unit, is configured to position the piston side sensor valve and a piston rod side drain valve in an open state when adding or draining hydraulic fluid to/from the piston side of the hydraulic cylinder, and wherein the piston rod side drain valve is arranged in fluid communication with the piston rod side of the hydraulic cylinder and a drain tank.

7. The hydraulic system according to claim 3, wherein a piston rod side drain valve is arranged in fluid communication with the piston rod side of the hydraulic cylinder and a drain tank.

8. The hydraulic system according to claim 3, wherein a piston rod side sensor valve is arranged in fluid communication with the piston rod side of the hydraulic cylinder and the sensor.

9. The hydraulic system according to claim 8, wherein the control unit is configured to position the piston rod side sensor valve and a piston side drain valve in an open state when adding or draining hydraulic fluid to/from the piston rod side of the hydraulic cylinder, and wherein the piston side drain valve is arranged in fluid communication with the piston side of the hydraulic cylinder and a drain tank.

10. The hydraulic system according to claim 3, wherein a piston side drain valve is arranged in fluid communication with the piston side of the hydraulic cylinder and a drain tank.

11. A hydraulic system for a working machine comprising a hydraulic cylinder for raising and lowering an implement, the hydraulic system comprising
a sensor for measuring a pressure in the hydraulic cylinder;
a control unit for controlling the movement of the hydraulic cylinder; and
a hydraulic accumulator unit arranged in fluid communication with a pressure side of the hydraulic cylinder and the sensor;
wherein the control unit is configured to compare a pressure value measured by the sensor with a preset target pressure level range and to control the pressure in the hydraulic cylinder to be within the preset target pressure level range by adding or draining hydraulic fluid to/from the pressure side of the hydraulic cylinder by receiving hydraulic fluid from the hydraulic accumulator unit or by providing hydraulic fluid to the hydraulic accumulator unit for maintaining a substantially constant ground contact force between the implement and the ground, wherein the pressure side of the hydraulic cylinder is a piston side of the hydraulic cylinder, wherein hydraulic fluid is added or drained to/from the piston side of the hydraulic cylinder for maintaining the substantial constant ground contact force between the implement and the ground, and wherein the control unit is configured to control a control valve such that a pump unit adds hydraulic fluid to the piston side of the hydraulic cylinder if the measured pressure value is below the preset pressure level range.

12. A hydraulic system for a working machine comprising a hydraulic cylinder for raising and lowering an implement, the hydraulic system comprising
a sensor for measuring a pressure in the hydraulic cylinder;
a control unit for controlling the movement of the hydraulic cylinder; and
a hydraulic accumulator unit arranged in fluid communication with a pressure side of the hydraulic cylinder and the sensor;
wherein the control unit is configured to compare a pressure value measured by the sensor with a preset target pressure level range and to control the pressure in the hydraulic cylinder to be within the preset target pressure level range by adding or draining hydraulic fluid to/from the pressure side of the hydraulic cylinder by receiving hydraulic fluid from the hydraulic accumulator unit or by providing hydraulic fluid to the hydraulic accumulator wilt for maintaining a substantially constant ground contact force between the implement and the ground, wherein the pressure side of the hydraulic cylinder is a piston rod side of the hydraulic cylinder, wherein hydraulic fluid is added or drained to/from the piston rod side of the hydraulic cylinder for maintaining the substantial constant ground contact force between the implement and the ground.

13. The hydraulic system according to claim 12, wherein the control unit is configured to control a control valve such that a pump unit adds hydraulic fluid to the piston rod side of the hydraulic cylinder if the measured pressure value is below the preset pressure level range.

14. The hydraulic system according to claim 12, wherein the control unit is configured to control a control valve such that hydraulic fluid is drained from the piston rod side of the hydraulic cylinder if the measured pressure value is above the preset pressure level range.

15. A control unit for controlling an implement of a working machine comprising a hydraulic cylinder for raising and lowering the implement, a sensor for measuring a pressure in the hydraulic cylinder, and a hydraulic accumulator unit arranged in fluid communication with a pressure side of the hydraulic cylinder and the sensor, wherein the control unit is configured to compare a pressure value measured by the sensor with a preset target pressure level range and to control the pressure in the hydraulic cylinder to be within the preset target pressure level range by adding or draining hydraulic fluid to/from a pressure side of the hydraulic cylinder solely by receiving hydraulic fluid from the hydraulic accumulator unit or by providing hydraulic fluid to the hydraulic accumulator unit for maintaining a substantially constant ground contact force between the implement and the pound.

16. A method for controlling an implement of a working machine comprising a hydraulic cylinder for raising and lowering the implement, the method comprising:
comparing a pressure value in the hydraulic cylinder with a preset target pressure level range; and
controlling the pressure in the hydraulic cylinder to be within the preset target pressure level range by adding or draining hydraulic fluid to/from a pressure side of the hydraulic cylinder solely by receiving hydraulic fluid from a hydraulic accumulator unit or by providing hydraulic fluid to the hydraulic accumulator unit for maintaining a substantially constant ground contact force between the implement and the ground.

17. A control system for a working machine provided with an implement and a hydraulic cylinder for raising and lowering the implement, the control system has a selectable mode for controlling the lift arm, in which selectable mode hydraulic fluid is added or drained to/from a pressure side of the hydraulic cylinder solely by receiving hydraulic fluid from a hydraulic accumulator unit or by providing hydraulic fluid to the hydraulic accumulator unit for maintaining a substantially constant ground contact force between the implement and the ground.

18. The control system according to claim 17, wherein the selectable mode has a first operating mode in which the substantially constant ground contact force being lower than a ground contact force caused by the dead weight of the lift arm and the implement when the implement passively rest against the ground.

19. The control system according to claim 18, wherein hydraulic fluid is configured to be added or drained to/from a piston side of the hydraulic cylinder when the control system is in the first operating mode.

20. The control system according to claim 17, wherein the selectable mode has a second operating mode in which the substantially constant ground contact force being higher than a ground contact force caused by the dead weight of the lift arm and the implement when the implement passively rest against the ground.

21. The control system according to claim 20, wherein hydraulic fluid is configured to be added or drained to/from a piston rod side of the hydraulic cylinder when the control system is In the second operating mode.

22. The control system according to claim 21, wherein the control system is further configured to switch from the first operating mode to the second operating mode by moving a piston rod side drain valve from an open position to a closed position and moving a piston side drain valve from a closed position to an open position, wherein the piston rod side drain valve is arranged in fluid communication with the piston rod side of the hydraulic cylinder and a drain tank and the piston side drain valve is arranged in fluid communication with the piston side of the hydraulic cylinder and the drain tank.

\* \* \* \* \*